Feb. 22, 1944.   C. E. NELSON   2,342,423
CULTIVATOR
Filed Oct. 30, 1942   2 Sheets-Sheet 1

Inventor
Clyde E. Nelson,
By McMorrow and Berman
Attorneys

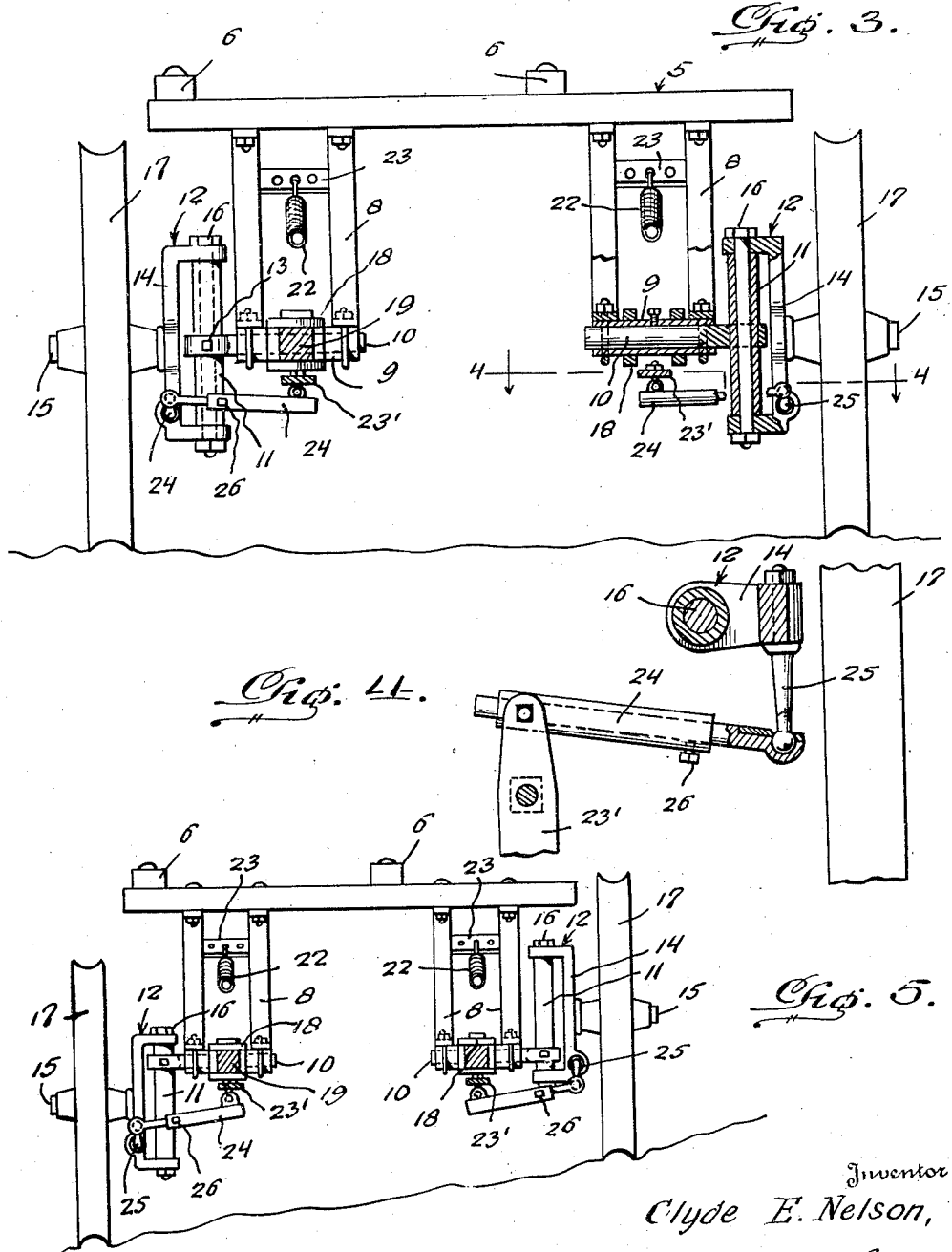

Patented Feb. 22, 1944

2,342,423

UNITED STATES PATENT OFFICE 2,342,423

CULTIVATOR

Clyde E. Nelson, Chipley, Fla.

Application October 30, 1942, Serial No. 463,926

1 Claim. (Cl. 97—155)

This invention relates to a cultivator of the character supported by ground wheels and pulled by a draft animal and controlled by a person walking in behind thereof. A cultivator of the stated character is extremely difficult to handle by the operator, especially when operating on a hillside or when cultivating vegetation growing in rows. Therefore, the primary object of this invention is the provision of means for leveling the cultivator frame when operating on a hillside to prevent side slip and to permit the operator to steer the ground wheels in the same direction as the shovels are steered to bring the shovels to a desired distance of the vegetation growing in the rows.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a cultivator constructed in accordance with my invention.

Figure 3 is a transverse sectional view showing the means of mounting the ground wheels in order that they may be steered.

Figure 4 is a sectional view taken on the line 4—4 of Figure 3.

Figure 5 is a transverse sectional view showing the device adjusted for operation on a hillside.

Figure 1:
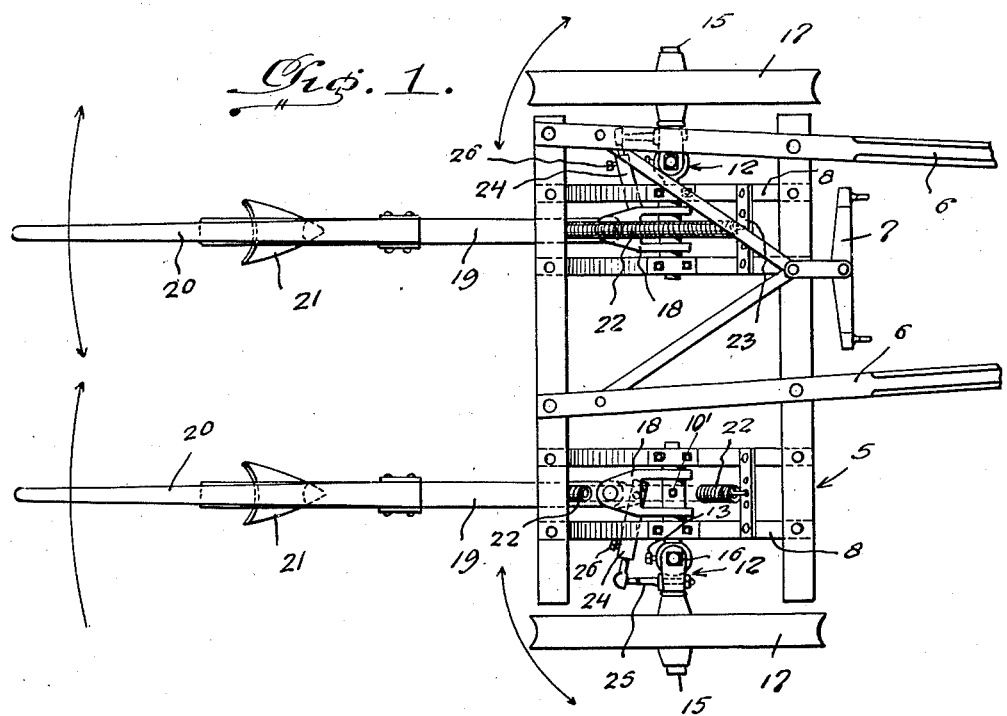
Figure 2:
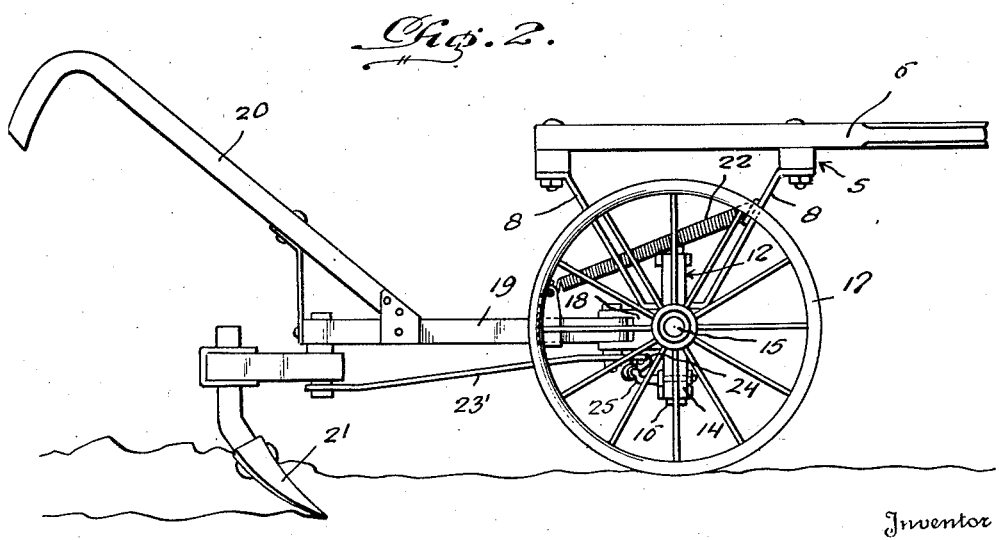
Figure 2 is a side elevation illustrating the device.

Referring in detail to the drawings, the numeral 5 indicates a main frame to which are secured shafts 6 for a draft animal. Also secured to the frame 5 is a singletree 7. Pairs of depending substantially U-shaped brackets 8 are secured to the frame 5 and have detachably secured thereto horizontally arranged spaced axle sleeves 9. The pairs of brackets 8 are spaced to permit the use of this device in straddling rows of growing plants or vegetation when desired. Adjustable endwise in the sleeves 9 are axles 10 which may be held in any adjusted position by means of set screws 10'. The outer ends of the axles are in the form of eyes to slidably receive vertically arranged sleeves 11 forming part of steering knuckles 12. The axles may be adjusted vertically of the sleeves 11 and held in adjusted position by set screws 13.

The steering knuckles 12 include substantially U-shaped yokes 14 on which wheel spindles 15 are formed. King bolts 16 extend through the yokes 14 and the sleeves 11. The king bolts permit the yokes to swing about vertical axes.

Ground wheels 17 are journaled on the spindles 15 for the support of the device.

Clevises or yokes 18 are mounted on the axle sleeves for coupling thereto shovel beams 19, each equipped with a handle 20. The shovels of the cultivator are indicated by the character 21 and are mounted on the shovel beams 19. Coil springs 22 are connected to the shovel beams and to braces 23 secured on the depending brackets 8 for regulating the depth of operation of the shovels in the ground. The yokes or clevises 18 permit pivotal movement of the shovel beams horizontally. The pivotal movement of the shovel beams may be brought about by the operator grasping the handles 20 and walking behind the device. In this manner the operator can control the direction of travel of the shovels to bring them closer or further away from rows of growing vegetation as desired.

Steering rods 23' are secured to the beams 19 adjacent the shovels and are pivotally mounted on the yokes or clevises 18. Drag links 24 are connected to the steering rods 23' by a ball and socket joint and are connected to arms 25 of the steering knuckles 12 by ball and socket joints. The drag links 24 are of telescopic construction whereby the length of the drag links may be varied. The telescopic sections of the drag links may be secured in adjusted positions by set screws 26. The arms 25 of the steering knuckles are detachably secured to the yokes 14 and are curved, the purpose of which is to permit the ends of the arms connected to the drag links to be raised and lowered. This is desirable when making adjustments for the device to operate either on level ground or on a hillside, so that the drag links may be kept substantially in a horizontal plane.

Thus it will be seen that the operator guiding the shovels, also will guide the ground wheels greatly assisting the operator in bringing the shovels in proper relation to the rows of growing vegetation.

Figure 5 shows the device adjusted for operation on a hillside to level the frame 5 and to assist in preventing side slipping on the hillside. To bring about this adjustment one of the axle sleeves is lowered on one of the steering knuckles while the other axle is elevated on the sleeve 11 of the other steering knuckle. It will be seen by reference to Figure 5 that one of the arms 25 is arranged to have its ball end directed upwardly while the other arm is directed downwardly.

The axles 10 being adjustable in the sleeves 9 will permit the distances between the ground wheels to be varied. Also it will be necessary during such adjustments to lengthen or shorten the drag links. The telescopic construction thereof and the set screws permit this adjustment to be easily carried out.

While I have shown and described the preferred embodiment of my invention, it will be understood that minor changes in construction, combination and arrangement of parts may be made without departing from the spirit and scope of the invention as claimed.

Having thus described the invention, what I claim is:

In a cultivator, a frame, depending pairs of brackets secured to the frame, sleeve bearings removably secured to said pairs of brackets and arranged transversely of the frame and spaced from each other, axle shafts mounted in said bearings for endwise adjustment and having apertured ends, vertically arranged king bolt bearings adjustably secured in the apertured ends of the axle shafts for vertical adjustment relative thereto, and adjustable independent of each other, forks engaging ends of said king bolt bearings, king bolts detachably and pivotally securing the forks to the king bolt bearings, ground wheels rotatably supported on said forks, beams pivoted on said sleeve bearings for swinging movement and including handles and cultivating elements, steering rods secured to the beams adjacent the cultivating elements and pivoted on said sleeve bearings for swinging movement with the beams, and connecting links adjustable as to length pivoted to said forks and to the steering rods adjacent to the pivots thereof on said sleeve bearings.

CLYDE E. NELSON.